United States Patent
Barrett et al.

(10) Patent No.: US 6,400,381 B1
(45) Date of Patent: Jun. 4, 2002

(54) WEB PLACES

(75) Inventors: Robert Carl Barrett, Sunnyvale; Paul Philip Maglio, Santa Cruz, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/330,639

(22) Filed: Jun. 11, 1999

(51) Int. Cl.⁷ .................................................. G06F 3/00
(52) U.S. Cl. ..................................... 345/758; 345/745
(58) Field of Search ............................. 345/811, 812, 345/813, 760, 749, 734–738, 751–752, 758, 753–757, 759, 745, 746, 835–839; 707/10, 11, 201; 709/230

(56) References Cited

U.S. PATENT DOCUMENTS

| | | | |
|---|---|---|---|
| 5,727,129 A | 3/1998 | Barrett et al. ................ 395/12 |
| 5,727,950 A | 3/1998 | Cook et al. ................ 434/350 |
| 5,751,965 A | * 5/1998 | Mayo et al. ................ 345/735 |
| 5,764,916 A | 6/1998 | Busey et al. ........... 395/200.57 |
| 5,790,426 A | 8/1998 | Robinson ................... 364/554 |
| 5,796,393 A | 8/1998 | MacNaughton et al. .... 345/329 |
| 5,796,952 A | 8/1998 | Davis et al. ........... 395/200.54 |
| 5,799,292 A | 8/1998 | Hekmatpour ................ 706/11 |
| 5,812,769 A | 9/1998 | Graber et al. .......... 395/200.12 |
| 5,937,163 A | * 8/1999 | Lee et al. ................... 345/734 |
| 5,995,097 A | * 11/1999 | Tokumine et al. .......... 345/745 |
| 5,995,098 A | * 11/1999 | Okada et al. ............... 345/745 |
| 6,031,528 A | * 2/2000 | Langfahl, Jr. ............... 345/744 |
| 6,225,999 B1 | * 5/2001 | Jain et al. ................... 345/734 |

* cited by examiner

*Primary Examiner*—Steven Sax
(74) *Attorney, Agent, or Firm*—John L. Rogitz

(57) ABSTRACT

A system and method for promoting social interaction among computer users displaying similar historical activities on the World Wide Web, based not on a single document access or on a predefined grouping, but on the activities of the users. A history of a group of documents accessed, or a pattern of document access, or the frequency of terms in queries, are gathered and communicated to a place server module. When the histories of two or more computers match each other in accordance with match criteria, a communication group is established by the place server module and communicated to a chat server. The chat server then automatically establishes a chat room for members of the communication group. Each client computer displays a chat window including moving icons representing other members of the group.

16 Claims, 2 Drawing Sheets

CLIENT PROXY

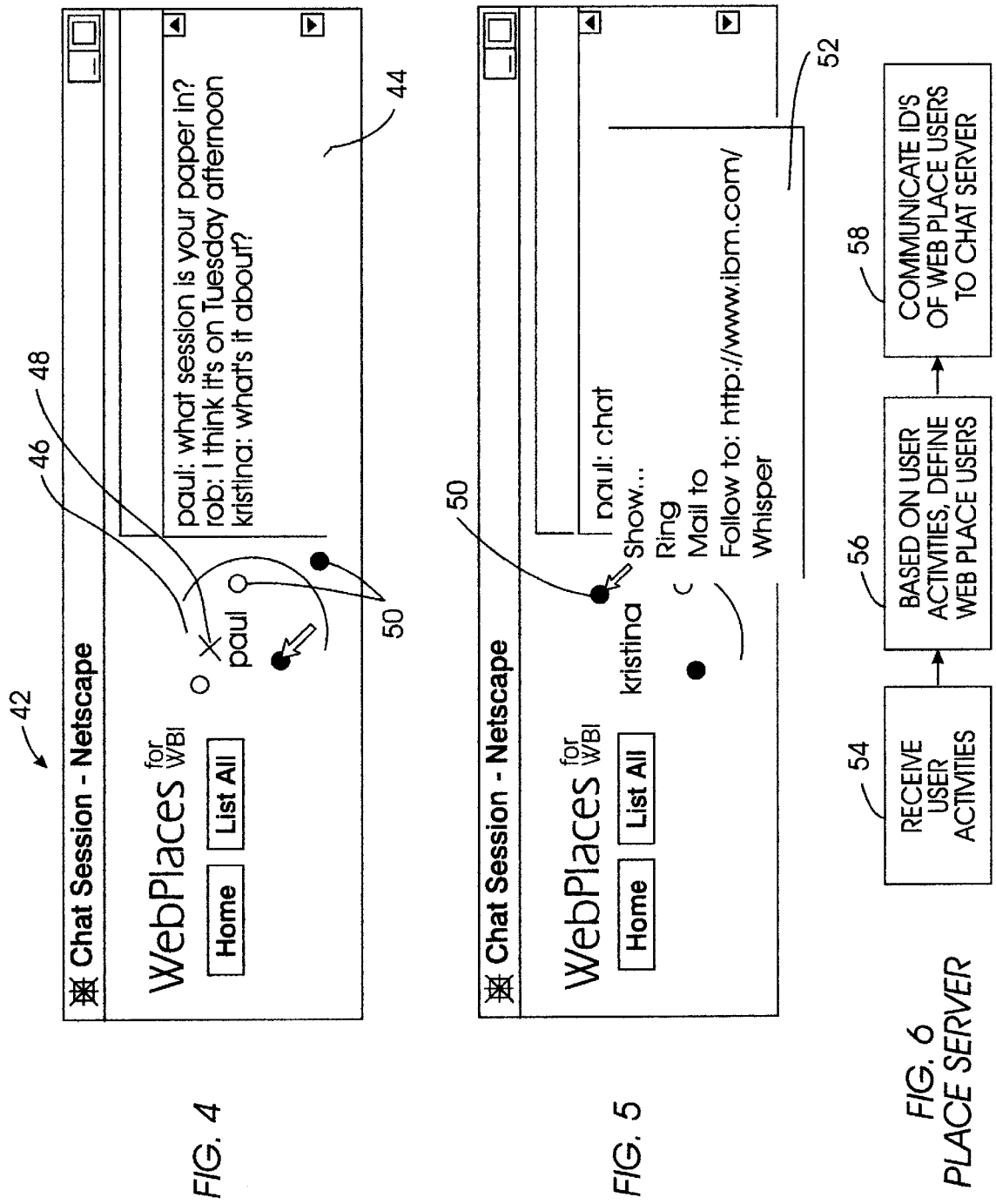

WEB PLACES

BACKGROUND OF THE INVENTION

1. Field of the Invention

The present invention relates generally to establishing computer-based user communities, and more particularly to establishing computer user communities based on user activities on the Web.

2. Description of the Related Art

The World Wide Web and other information repositories such as online databases afford quick access to a large amount of information. Users typically interact only with the information, however, and generally do not share a sense of community with other users who might nevertheless be interested in the same topics. In other words, most social interactions using the Web are asynchronous (e.g., a user reads what another user has written sometime earlier), and lack the richness of ordinary communication. The present invention understands that Web users as well as content providers would benefit from creating a sense of community in cyberspace, for many of the same economic and psychic reasons that physical markets such as shopping malls benefit both store owners and shoppers by creating a sense of personalized community.

Isolated social places currently exist on the Web, but they suffer inadequacies with respect to effectively promoting meaningful social interaction. One type of social place is centered on a single document, such as a chat room. Users access the document and by means of "chat" technology converse with each using their computers. The drawback with single-document social places, however, is two-fold. Under some circumstances, there may be few if any companion users in, e.g., a chat room who would be appropriate social partners for a person wishing to engage in social activity. Indeed, although present in the chat room with each other, users might very well share little if any commonality with each other. Currently, there is no way to account for this fact. On the other hand, many thousands of users might be clustered around a single document. It will readily be appreciated, however, that social interactions in a crowded place can be as difficult to strike up as in an empty place.

A second type of Web community is one that is based on a predefined grouping (i.e., a "buddy list"). Examples of such communities are set forth in U.S. Pat. Nos. 5,796,393 and 5,727,950. In these systems, communication is established between members of a predefined group, e.g., users of America Online (AOL)®, or students that are pre-grouped by an instructor. In any case, these systems do not use indicia that can be expected to be related to user preferences, but rather rely on arbitrary groupings of a disparate collection of users who might in fact share little or no social interests with each other.

As understood by the present invention, a good gauge of a user's social preferences and/or characteristics can be had from the user's computer-based activities. As an example, suppose that children of various ages access a Web page related to dinosaurs. The present invention postulates that fifth graders might use similar paths as each other to arrive at the Web page, whereas ninth graders might, on the whole, take a different path to arrive at the page, and that this information can be used to place the fifth graders in communication with each other, with whom they are more likely to share common interests than with ninth graders.

As recognized by the present invention, U.S. Pat. Nos. 5,796,952 and 5,727,129, both of which are incorporated herein by reference, provide methods for monitoring and storing activities of users of networked information. The referenced methods do so for reasons other than for promoting social interaction, however, and thus do not consider or recognize that such user activity-based information might be advantageously used to facilitate social interactions on computer networks, such as the Web.

The present invention has carefully considered the above problems and has provided the solution set forth herein.

SUMMARY OF THE INVENTION

A computer-implemented method is disclosed for establishing at least one communication grouping that includes at least first and second client computers based on user activity with respect to an information repository, such as the World Wide Web. The method includes storing respective first and second histories of user activities undertaken with the first and second client computers with respect to the information repository. As intended by the present invention, the user activities can include accessing at least two documents in the repository, inputting at least one query, and establishing a pattern of document access. The communication grouping is established based on the first and second histories of user activities. In a preferred embodiment, the communication grouping is established when the activities of the first client computer match the activities of the second client computer in accordance with predefined criteria.

Preferably, a chat room is established between computers in a grouping. Also, communication windows including chat windows are displayed on respective monitors associated with the client computers. In a particularly preferred embodiment, the communication windows display icons that represent client computers in the communication grouping.

In another aspect, a computer system includes at least two client computers communicating with the World Wide Web. Each client computer is associated with a client proxy, and the client proxy accesses, for each client computer, user activity information that represents at least one of: a group of Web pages accessed by the client computer, a pattern of Web page access established by the client computer, and query terms input to the client computer. A place server receives the user activity information and based thereon determines whether to establish a communication grouping among the client computers.

In still another aspect, a computer program storage device establishes a client proxy that includes a program of instructions. In turn, the program of instructions includes structure to undertake the following method. For at least one client computer, a history of user activities undertaken with the client computer with respect to an information repository such as the World Wide Web is stored. The user activities are among the group of activities consisting of: accessing at least two documents in the repository, inputting at least one query, and establishing a pattern of document access. The history is communicated to a place server module, and a window is displayed that represents companion client computers in a communication grouping based on the histories of the client computers.

In yet another aspect, a computer program storage device establishes a place server including a program of instructions that in turn includes structure to undertake the following method. From each of plural client computers, a respective history of user activities undertaken with the client computer with respect to an information repository such as the World Wide Web is received. The user activities are among the group of activities consisting of: accessing at least two documents in the repository, inputting at least one query, and establishing a pattern of document access. The method also includes, for client computers having histories that match each other in accordance with predefined criteria, establishing a communication grouping.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is a display of a chat window of the present invention;

FIG. 5 shows the chat window of FIG. 4, after a user has right-clicked on an icon; and FIG. 6 is a flow chart of the logic undertaken by the place server.

DETAILED DESCRIPTION OF THE PREFERRED EMBODIMENTS

Figure 1:
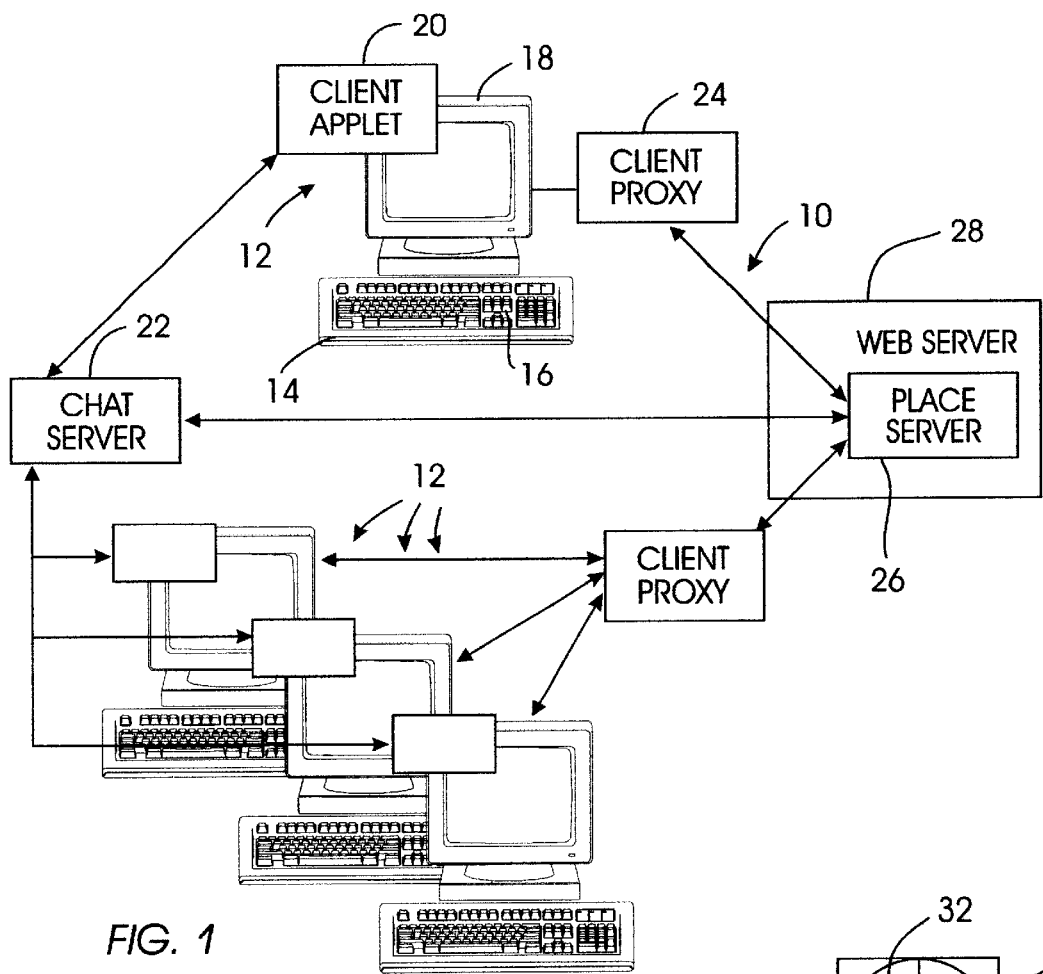
FIG. 1 is a block diagram of the architecture of the present system.

Referring initially to FIG. 1, a system is shown, generally designated 10, for promoting social interaction between users of networked information based on the activities of the users. As shown, the system 10 includes plural client computers 12, each client computer 12 including a respective input device such as a keyboard 14 with, e.g., a point and click device 16 and an output device such as a monitor 18. Also, each client computer 12 accesses a respective client applet 20 for communicating with a chat server 22 in accordance with chat principles known in the art. The communication paths shown herein are generally paths in an information repository such as, in one preferred embodiment, the World Wide Web or other online database. Accordingly, communication between computers herein can be via the Internet.

Additionally, each client computer 12 accesses a software-implemented client proxy 24. As shown in FIG. 1, each client computer 12 can have its own dedicated proxy 24, or several client computers 12 can share a proxy 24. The client proxies 24 communicate via the Internet with at least one software-implemented place server 26 that can reside, e.g., on a Web server 28.

Each computer 12 can be a personal computer made by International Business Machines Corporation (IBM) of Armonk, N.Y. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as printers, other computers or data storage devices, and computer networks.

Figure 2:
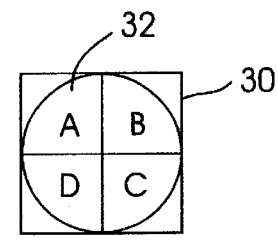
FIG. 2 is a schematic diagram of a computer program product.

In any case, the processor of each computer 12 accesses the associated client proxy 24 to undertake the logic of the present invention, which may be executed by a processor as a series of computer-executable instructions. Likewise, the Web server 28 accesses the place server 26 to undertake the instructions embodied by the present logic. The instructions may be contained on a data storage device with a computer readable medium, such as a computer diskette 30 shown in FIG. 2 having a computer usable medium 32 with code elements A–D stored thereon. Or, the instructions may be stored on random access memory (RAM) of the computer 12, on a DASD array, or on magnetic tape, conventional hard disk drive, electronic read-only memory, optical storage device, or other appropriate data storage device. In an illustrative embodiment of the invention, the computer-executable instructions may be lines of JAVA code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 3:
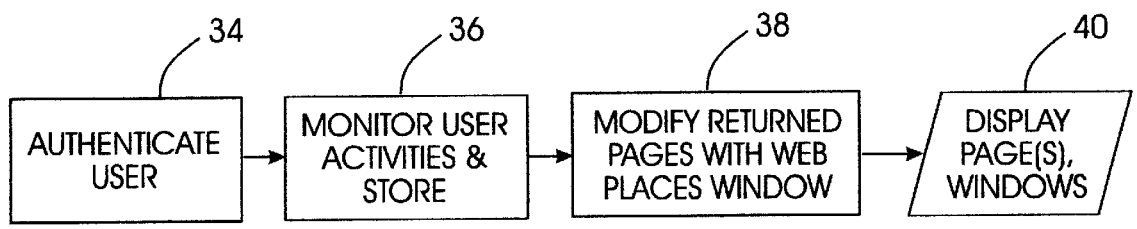
FIG. 3 is a flow chart of the client proxy logic undertaken at a client computer.

Now referring to FIG. 3, the logic of the present client proxy 24 can be seen. Commencing at block 34, the client proxy 24 authenticates the user of the associated client computer 12 using, e.g., the Proxy-Authenticate mechanism of hypertext transfer protocol (HTTP)/1.1. Whenever the user accesses a uniform resource listing (URL) of a Web page, the client proxy 24 checks for a valid proxy-authenticate field in the HTTP request header. If it is not present, the proxy 24 returns an authentication challenge, which causes the browser program of the client computer 12 to prompt the user for an identification and password. When a valid authentication is received by the client proxy 24, the proxy 24 uses that information to identify the user among a pool of users that are registered with the proxy 24. When communicating with the proxies of the present architecture, the client proxy 24 generates a unique identifier for each user by concatenating the user ID and the IP address of the client proxy 24. This identifier is unique across all users of all client proxies in the system 10.

After authentication, the logic moves from block 34 to block 36, wherein the client proxy 24 monitors the user's activities in the information space, e.g., the client proxy 24 monitors the user's Web browsing activities. In the Web context, the client proxy 24 undertakes the function at block 36 by intercepting requests for URLs, recording the URL, then passing the request on to the appropriate Web server to retrieve the requested document. Then, the client proxy 24 checks the response code of the Web server to ensure that the page has been successfully retrieved. If so, the client proxy 24 sends a message to the place server 26 indicating that the client computer 12 has moved to a new Web page. The page URLs and sequence with which they are accessed are stored at the client proxy 26.

Proceeding to block 38, the client proxy 24 modifies Web pages that are returned to the client computer 12 by adding a small JavaScript to each Web page to instruct the browser to create a Web Places window on the page, and to load the client applet 20 into the page. Alternatively, the applet itself can be loaded onto the top of the Web page. The client proxy 24 can also provide person- and place-dependent annotation on Web pages, including additional links to Web pages of interest to others in the communication grouping of the particular client computer 12 or artifacts that others have written to the communication grouping. The communication grouping and the various ways in which it can be established are discussed further below.

In further detail regarding the client applet 20, the client proxy 24 informs the applet 20 of the user ID and the location of the chat server 22. Accordingly, when the client applet 20 is opened, it establishes communication in the form of a chat session with the chat server 22 via a persistent socket connection. More particularly, the client applet 20 identifies the user to the chat server 22, and in response the chat server 22 returns to the client applet 20 an identification of the communication grouping it is in and a list of other users in the grouping, for uses to be shortly disclosed. Chat communication can then be undertaken between the various users in the communication grouping in accordance with principles known in the art. Once the client applet 20 has received the above information, the logic moves to output state 40, wherein the Web page is displayed along with the above-mentioned window, showing other users in the same communication grouping.

FIGS. 4 and 5 show an example of a window 42 that is generated by the present logic for superimposition of the window 42 onto a Web page. As shown, the window 42 can include a chat window 44 and a graphics area 46 having a center 48. The chat window 44 of each client computer 12 contains the "chat" from all of the users of the relevant communication grouping, as received from the chat server 22. Thus, a chat room is established for all client computers 12 in a communication grouping.

In contrast, the graphics area 46 presents a graphical depiction of the communication grouping in which the client computer 12 has been placed, based on the activities of the user of the client computer. Accordingly, in the graphics area 46, icons 50 that represent client computers 12 in the communication grouping are displayed. The icons 50 can be made to move, such that an icon 50 moves toward the center 48 when the associated client computer 12 is actively communicating with another member of the communication grouping. Further, an icon 50 can be caused to oscillate when the associated client computer moves from a first Web page to a second Web page.

When a user right-clicks on an icon 50, a pop-up menu 52 can appear as shown in FIG. 5. It can be appreciated in reference to FIG. 5 that the pop-up menu 52 can be selected to show further data regarding the client computer 12 represented by the clicked-on icon 50. Also, the pop-up menu 52 can be used to telephone or email the user of the client computer 12 represented by the clicked-on icon 50. Further, the pop-up menu 52 can be used to open the Web page at which the user represented by the clicked-on icon 50 is located, or to open a private chat line ("whisper") with the user represented by the clicked-on icon 50.

Now referring to FIG. 6, the place server 26 receives, from the client proxies 24, both historical user activities stored at the client proxies 24 in accordance with the above disclosure, and signals representing real-time navigation undertaken by the client computers 12. With this user activity information, at block 56 the place server 26 defines communication groupings of similar users. The user activities received from the client proxies 24 can include the accessing of at least two documents such as Web pages, and preferably include a list of Web pages accessed within a period. Also, the activities can include particular query terms input to a search engine. Still further, the user activities on which a communication grouping is based can include a pattern of document access, e.g., a navigation path or paths that a user has followed while browsing from Web page to Web page. The above-referenced U.S. Pat. No. 5,727,129 provides one method for establishing such patterns.

In accordance with the present invention, a communication grouping is established when the activities of a client computer 12 matches the activities of one or more other, companion client computers 12 in accordance with predefined criteria. For example, when at least a predetermined percentage (e.g., 50%) of documents accessed by a first client computer 12 are found to have been accessed by a second client computer 12, a communication grouping can be established that includes the two computers 12 and any other client computers who meet the criteria. Or, when a navigation path followed by a first client computer 12 is found to include a predetermined number or percentage of links used by a second client computer 12, either in the same or a different order, a communication grouping can be established that includes the two computers 12 and any other client computers who meet the criteria. Still again, when a predetermined percentage of query terms used by a first client computer 12 during, e.g., the preceding six months match query terms used by a second client computer 12 during the same period, a communication grouping can be established that includes the two computers 12 and any other client computers who meet the criteria. In any case, the communication groupings (1) depend on user activity, not predefined groupings, and (2) depend on client computers 12 in the same grouping having commonality of activity that is more than a simple, single document access. The client computers 12 in a communication grouping then communicate with other companion computers in the same grouping by means of, e.g., the window 42 shown in FIGS. 4 and 5.

With respect to the real-time navigation, at block 58 the place server 26 communicates the present location of each client computer 12 in a particular communication grouping to the chat server 22. Recall that the chat server 22 in turn notifies the client applets 20 of each client computer 12 in the communication grouping of the location and status of the companion client computers 12 in the grouping, for display thereof as set forth above.

While the particular WEB PLACES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer-implemented method for establishing at least one user communication grouping having at least first and second client computers in the grouping based on user activity with respect to an information repository, comprising the acts of:

for the respective first and second client computers, storing respective first and second histories of user activities undertaken with the first and second client computers with respect to the information repository, the user activities being among the group of activities consisting of: accessing at least two documents in the repository, inputting at least one query, and establishing a pattern of document access; and establishing the user communication grouping based on the first and second histories of user activities whereby the grouping can be represented on a display;

wherein the repository is the World Wide Web and each document is a Web page.

2. The method of claim 1, wherein the communication grouping is established when the activities of the first client computer match the activities of the second client computer in accordance with predefined criteria.

3. The method of claim 1, further comprising establishing at least one chat room based on the communication grouping.

4. The method of claim 3, further comprising displaying communication windows on respective monitors associated with the client computers, the communication windows displaying icons representative of client computers in the communication grouping.

5. The method of claim 4, wherein the act of storing histories is undertaken at each client computer and the act of establishing the communication grouping is undertaken at a place server communicating with the client computers.

6. A computer system comprising:

at least two client computers communicating with the World Wide Web, each client computer being associated with a client proxy, the client proxy accessing, for each client computer, user activity information representative of at least one of: a group of Web pages accessed by the client computer, a pattern of Web page access established by the client computer, and query terms input to the client computer; and at least one place server module receiving the user activity information and based thereon determining whether to establish a user communication grouping among the client computers whereby the grouping can be represented on a display.

7. The system of claim 6, wherein a first client computer is included in the communication grouping when its user activity information matches the user activity information of a second computer in accordance with predefined criteria.

8. The system of claim 7, further comprising a chat server module responsive to the place server module for establishing a chat room based on the user activity information.

9. The system of claim 8, wherein each client computer displays communication windows on respective monitors associated with the client computers, the communication windows displaying icons representative of client computers in the communication grouping.

10. A computer program storage device establishing a client proxy including a program of instructions including structure to undertake method acts comprising:

for at least one client computer, storing a history of user activities undertaken with the client computer with respect to an information repository, the user activities being among the group of activities consisting of: accessing at least two documents in the repository, inputting at least one query, and establishing a pattern of document access;

communicating the history to a place server module; and displaying a window representative of companion client computers in a user communication grouping, the user communication grouping being based on the history of the client computer and histories of the companion client computers wherein the repository is the World Wide Web and each document is a Web page.

11. The computer program storage device of claim 10, wherein the repository is the World Wide Web and each document is a Web page.

12. The computer program storage device of claim 11, wherein the window displays icons representative of client computers in the communication grouping.

13. The computer program storage device of claim 12, wherein the icons are displayed in an area defining a center, and an icon moves toward the center when the associated client computer is actively communicating with another member of the communication grouping.

14. The computer program storage device of claim 12, wherein an icon is caused to oscillate when the associated client computer moves from a first Web page to a second Web page.

15. A computer program storage device establishing a place server including a program of instructions including structure to undertake method acts comprising:

receiving from each of plural client computers a respective history of user activities undertaken with the client computer with respect to an information repository, the user activities being among the group of activities consisting of: accessing at least two documents in the repository, inputting at least one query, and establishing a pattern of document access; and for client computers having histories that match each other in accordance with predefined criteria, establishing a user communication grouping whereby the grouping can be represented on a display;

wherein the repository is the World Wide Web and each document is a Web page.

16. The computer program storage device of claim 15, further comprising the act of communicating the grouping to a chat server to establish communication among client computers in the communication grouping.

* * * * *